United States Patent [19]

Dancy

[11] 3,904,520

[45] Sept. 9, 1975

[54] PROCESS FOR THE CLARIFICATION OF BRINE

[75] Inventor: William B. Dancy, Carlsbad, N. Mex.

[73] Assignee: International Minerals & Chemical Corporation, Libertyville, Ill.

[22] Filed: Nov. 13, 1974

[21] Appl. No.: 523,227

[52] U.S. Cl. .................... 23/298; 23/302; 209/5; 210/47; 210/52
[51] Int. Cl.² .................................... B01D 9/02
[58] Field of Search ............ 23/298, 300, 302, 293; 209/5; 210/45, 47, 52

[56] References Cited
UNITED STATES PATENTS

| | | | |
|---|---|---|---|
| 2,211,397 | 8/1940 | Weinig | 23/298 |
| 2,738,254 | 3/1956 | Suhr | 23/298 |
| 2,788,257 | 4/1957 | Duke | 23/302 |
| 2,927,010 | 3/1960 | Baron | 23/302 |
| 3,451,788 | 6/1969 | Smith | 23/300 |
| 3,677,475 | 7/1972 | Dancy | 23/298 |

Primary Examiner—Samih N. Zaharna
Assistant Examiner—Ernest G. Therkorn
Attorney, Agent, or Firm—James E. Wolber; Peter Andress

[57] ABSTRACT

Sylvinite plant brine thickener underflow, which comprises an essentially saturated sodium chloride-potassium chloride brine containing clay slimes in amounts such as 5% and ore fines in amounts such as 20%, is clarified to provide an essentially solids-free brine by preparing a slurry consisting of an intimate admixture of clear sylvinite brine, halite tailings, and a small but effective amount of a suitable flocculent. The slurry is agitated and admixed with an equal or greater amount by weight of sylvinite brine thickener underflow, and the resulting mixture is filtered to recover clarified brine. In a preferred embodiment, the slurry and underflow are heated prior to filtration to dissolve solid potassium chloride in the ore fines and the clarified brine is cooled to crystallize solid potassium chloride, which is recovered.

11 Claims, No Drawings

PROCESS FOR THE CLARIFICATION OF BRINE

BACKGROUND OF THE INVENTION

Sylvinite ores contain recoverable amounts of sylvite (KCl), generally 9 to 30% calculated as $K_2O$, with the balance being mainly halite (NaCl). Varying minor quantities of other salts (which are sometimes also recovered) and insoluble material, which is mostly clay, occur in the ore. A typical sylvinite ore may contain 13 to 28% sylvite calculated as $K_2O$; clay in the amount of 3 to 5%; langbeinite, kieserite, polyhalite, and/or carnallite, in amounts such as 1 to 5%; with the balance being halite.

Various processes are known for the recovery of sylvite from such sylvinite ores. Processes commonly employed commercially include selective crystallization, froth flotation, and more recently, heavy media gravity separation. In all such wet beneficiation processes the separation is carried out in a sylvinite brine. The brine results from the dissolution of ore constituents in water, and its composition will vary somewhat depending upon the composition of the ore treated, the treatment process employed, and specific parameters of plant operation. The brine is generally saturated with respect to halite and substantially saturated with respect to sylvite. A typical clear brine analysis for froth flotation or heavy media beneficiation is as follows:

| Constituent | Percent by Weight |
| --- | --- |
| Sylvite | 10 |
| Halite | 15 |
| Magnesium salts (chloride or sulfate) | 8 |
| Water | 67 |

In actual plant operations the clay content of the ore tends to become finely divided and dispersed in the sylvinite plant brine. As the clay content of the brine increases, the efficiency of the plant operation is materially and adversely affected, for example, by the adsorption of flotation reagents on the finely divided clay surfaces or by increases in the viscosity and reduction in the settling rates achievable in the brine in gravity separations. It is therefore necessary to clarify the brine by removing insoluble materials therefrom.

In general, sylvinite plant brine has heretofore been clarified using mechanical rake thickeners or similar large vessels in which the plant brine is permitted to settle. Over a period of time the clay content of the brine settles to the bottom of the thickener along with very finely divided ore particles (sylvinite fines, mostly −100 Tyler mesh). Sometimes plant makeup water is added to the thickener, in which case the finely divided solid sylvite portion of the sylvinite fines is to some extent dissolved. Due to the low settling rate of clay in brine, particularly at relatively high clay concentrations, in practical commercial operations the thickener is operated to provide an essentially clarified overflow brine and a thickened underflow brine slurry which contains generally 4 to 7% by weight clay or clay-like materials, 15 to 25% finely divided sylvinite or salt, with the balance being sylvinite brine. A typical thickener underflow may contain 5% by weight clay or clay-like substances; 20% sylvinite fines, mainly as fine halite; and 75% brine having a typical analysis similar to that above stated.

In commercial sylvinite beneficiation processes the thickener underflow is generally discarded. It will be evident that for every ton of clay content of thickener underflow discarded, somewhat in excess of one ton of dissolved sylvite (calculated as $K_2O$) is discarded. Thus, the loss of sylvite, the product sought to be recovered, is substantial. In processing ores in which the ratio of sylvite to clay is relatively low, for example, in processing an ore containing 20% sylvite and 5% clay, a very material proportion of the valuable ore constituent is discarded with the thickener underflow, and the economics of the beneficiation operation are materially and adversely affected.

Many attempts have been made to reduce the loss of brine and hence of sylvite by filtering or centrifuging the thickener underflow to separate the brine from the clay and finely divided halite sought to be discarded. None have proven to be very attractive due to the low filtration rates and the high cost of the flocculents required to coagulate the clay. Nevertheless, a number of such processes have been proposed and in fact the addition of flocculent to thickeners in an effort to increase the settling rate and the ultimate clay concentration of the underflow has been employed commercially.

DESCRIPTION OF THE INVENTION

Briefly, the present invention provides a method for clarifying sylvinite brine wherein sylvinite plant brine containing clay and halite fines is settled in a thickener vessel to provide a clarified brine overflow and a thickened sylvinite brine thickener underflow containing clay and halite. The instant invention improves upon such processes by preparing a first slurry comprising about 25 to 50% by weight of an essentially clear sylvinite brine; about 50 to 75% by weight of halite tailings; and an effective amount of a flocculent to coagulate the clay; agitating the slurry thus produced to provide a uniform admixture; adding to the admixture sylvinite brine thickener underflow in a quantity sufficient to provide a second slurry containing about 35 to about 75% sylvinite brine thickener underflow; and filtering this slurry to recover a clarified sylvinite brine. The flocculent will typically be employed in the amount of about 1 to 4 lbs. of flocculent per ton of clay.

In accordance with the present invention, the full benefits of improved filtration rate in the final clarified sylvinite brine recovery step are achieved only when the flocculent is admixed with a slurry of essentially clear sylvinite brine and halite tailings. By "essentially clear" is meant that the sylvinite brine should be relatively free of clay. Freshly clarified brine such as thickener overflow brine or brine recovered from the instant process is suitable for use in preparing the brine-halite-flocculent admixture. Brines containing material quantities of clay, such as the thickener underflow itself, are entirely unsatisfactory. In general, the brine must contain less than 0.3% clay-like substances. Similarly, the halite employed should be relatively free of clay. Ordinary sylvinite beneficiation tailings are satisfactory. The particle size distribution of the halite tailings is not critical, but ideally the halite will be fairly coarse, preferably −6 +65 mesh.

The composition of the sylvinite brine thickener underflow treated in accordance with the instant invention is not critical. However, such thickener underflows will typically contain 15 to 25% finely divided sylvinite salts, mostly halite; 4 to 7% insoluble materials which are mostly clay or clayey substances; with the balance being sylvinite brine. Such thickener underflows are eminently suited for treatment in accordance with the process of this invention. A typical thickener underflow analysis for a sylvinite froth flotation plant may be insoluble clay-like substances 5%; fine halite 15%; fine sylvite 5%; other salts 1%; sylvinite brine 74%. If makeup water is added to the thickener, the salt content, especially sylvite content, is reduced.

In some instances, the halite tailing fraction from a heavy media or froth flotation operation is transported, for convenience, in plant sylvinite brine. In such instances it is not necessary to recover the halite as a dry solid before preparing the brine halite flocculent slurry in accordance with this invention. Rather, the slurry may be prepared by dewatering the halite slurry, as in a hydrocyclone as the cyclone underflow, to recover a halite slurry containing the desired ratios of brine and halite. Further, the very fine halite may desirably be separated together with excess brine in the cyclone overflow. Care should be taken to insure that the slurry is essentially free of clay contaminants, i.e., contains less than about 0.3% clay. If excess clay is present, the halite tailings may be reduced to a filter cake and then reconstituted with clarified brine to produce a slurry which is sufficiently free from clay-like substances.

The quantity of flocculent employed is not critical, although an effective amount must be used. The amount is not readily definable, since different flocculents are customarily employed in varying amounts depending upon their relative effectiveness and concentration. Neither the chemistry of the flocculents nor the amount in which they are used form a part of the instant invention. Rather the instant invention contemplates the use of prior art flocculents which may be selected on the basis of their relative cost and effectiveness. Generally the operator will choose a flocculent which in his judgment will provide the lowest cost for a given benefit. This cost/benefit ratio is of greater practical importance than the chemistry of the flocculent or the amount in which it is used. In general, the flocculent may be employed in the amount of about 1 to about 4 lbs. per ton of dry clay in the underflow to be treated.

In accordance with the instant invention, it is possible to recover by filtration most of the sylvinite brine employed to prepare the brine-halite flocculent slurry together with most of the sylvinite brine in the sylvinite brine thickener underflow treated. Recovery of brine can, if desired, be further enhanced in the final filtration step by washing the resultant filter cake with a small amount of water, and more preferably with saturated halite brine, before the filter cake is discarded. The wash will recover additional quantities of brine present in the filter cake and can be used as makeup water for the beneficiation plant. Halite brine is preferred to prevent excessive filter cake dissolution, which tends to impede the filtration.

In accordance with this invention, in a typical plant operation in which the discard of thickener underflows involves the loss of 1.90 tons of sylvite (dissolved in brine) per ton of clay discarded, the process of this invention will result in the reduction of this loss to as low as about 0.14 tons of sylvite per ton of clay.

In a preferred embodiment of this invention, advantage is taken of the temperature-solubility relationships of sodium chloride and potassium chloride. While the quantity of sodium chloride in a saturated sodium chloride-potassium chloride brine is essentially independent of temperature in the range of 0° to 100° C., the quantity of potassium chloride contained in such a saturated system increases materially with increases in temperature. This relationship is well known and employed commercially in crystallization processes for the production of potassium chloride cyrstals of greater purity than is generally required for general fertilizer use. Such products, known usually as "white muriate," command a premium price with respect to 60 $K_2O$ fertilizer grade muriate of potash.

In accordance with this invention the slurry prepared by mixing halite tailings with clarified sylvinite brine is heated from ambient temperature to a temperature not in excess of about 60° C., and generally in the range of 50° to 60° C. Residual solid sylvite in the halite tailings will dissolve. The slurry is then conditioned with flocculent as before described. The thickened brine underflow is similarly heated to a temperature not in excess of 60° C. and preferably 50° to 60° C. As before described, the thickened brine underflow will generally contain sylvinite fines, a portion of which is essentially −100 mesh sylvite. This sylvite will quickly dissolve as the temperature of the underflow is raised. The thickened brine underflow and the flocculent-halite slurry are then admixed and filtered as before described. Following filtration, the clarified sylvinite brine is cooled, as by vacuum cooling, preferably to a temperature in the range of about 25° to 35° C., with the result that the sylvite dissolved in the heating step is crystallized and can be recovered by decanting or centrifuging the cooled, clarified brine. The grade of the resulting cyrstals corresponds with the desirable white muriate product.

Depending upon production requirements, it may be desirable to further heat the clarified brine after the filtration step to a temperature such as 85° to 95° C., and then add further fine potassium chloride which should be relatively pure but may be of less than commercial grade. Dust collector fines from the flotation product dryer are eminently well suited for this purpose. In any case, fine potassium chloride is added in an amount sufficient to provide a saturated solution at an elevated temperature such as 90° C., with the result that in the following cooling step, which again may be vacuum cooling, the added potassium chloride is additionally crystallized and the production of the desirable white muriate product is increased.

If temperatures in excess of 60° C. are employed, the heating should be carried out in two steps as described. It has been found that filtration of the slurry becomes difficult at temperatures above 60° C. and the benefits of this invention, e.g., high filtration rates, are to a substantial degree lost if the filtration is carried out at temperatures higher than about 60° C.

Further, it has been found that it is most advantageous to condition the heated clarified brine-halite tailings slurry with flocculent at a temperature in the range of about 50° to 60° C. Therefore, it is preferred to heat and condition the slurry separately from the thickened brine underflow. It is, however, possible to condition the clarified brine-halite tailings slurry with flocculent, mix it with the thickened brine underflow, and then heat the admixture to a temperature not in excess of 60° C. prior to filtration. Whether additional heating after filtration is employed or not, care should be taken to insure that the clarified sylvinite brine is saturated with respect to potassium chloride before cooling. This may readily be accomplished, if necessary, by the addition of fine potassium chloride. Maintaining the solution at saturation prior to cooling suppresses the formation of glaserite in the cooling step. While the glaserite is not particularly troublesome as a product contaminant, its formation does tend to create serious operational difficulties.

The process of this invention is illustrated and compared with other processes in the following examples:

EXAMPLE 1

Control — Underflow plus Brine

Five hundred grams of slurry from a sylvinite brine thickener underflow and 85 grams of clear sylvinite plant brine were admixed and filtered on a Buckner funnel and flask equipped to measure the amount of filtrate produced at various time intervals. The slurry contained about 375 grams of brine from the underflow or 460 grams of brine including the supplemental clear brine.

| Time Interval | | Grams Filtrate | % Brine Recovered |
| --- | --- | --- | --- |
| 15 | seconds | 38 | 8 |
| 30 | " | 63 | 14 |
| 45 | " | 82 | 18 |
| 60 | " | 100 | 22 |
| 120 | " | 147 | 32 |
| 180 | " | 184 | 40 |
| 240 | " | 218 | 47 |
| 300 | " | 243 | 53 |

EXAMPLE 2

Control — Underflow Plus Flocculent

To 500 grams of sylvinite brine thickener underflow and 85 grams of clear sylvinite plant brine (as in Example 1) was added 10 cc of Polyhall 650 (a high molecular weight commercial flocculent) made up in water at a concentration of 0.25%. This flocculent rate (undiluted) is the equivalent of 2 lbs. per ton of water insolubles (clay) in the underflow. The mixture was filtered as in Example 1.

| Time Interval | | Grams Filtrate | % Brine Recovered |
| --- | --- | --- | --- |
| 15 | seconds | 90 | 20 |
| 30 | " | 141 | 31 |
| 45 | " | 182 | 40 |
| 60 | " | 215 | 47 |
| 90 | " | 264 | 57 |
| 120 | " | 300 | 65 |
| 150 | " | 323 | 70 |

Filtration rates essentially doubled due to the treatment with the flocculent.

EXAMPLE 3

Control — With Tailing Salt

The procedure was the same as in Example 2 except that 275 grams of coarse salt tailings (halite) was added to the underflow-flocculent-brine mixture.

| Time Interval | | Grams Filtrate | % Brine Recovered |
| --- | --- | --- | --- |
| 15 | seconds | 61 | 13 |
| 30 | " | 113 | 25 |
| 45 | " | 150 | 33 |
| 60 | " | 183 | 40 |
| 90 | " | 239 | 52 |
| 120 | " | 285 | 62 |
| 150 | " | 316 | 69 |
| 180 | " | 330 | 72 |

The addition of tailings salt reduced filtration rates somewhat comparing the results of Example 3 with Example 2. Rates were superior compared with rates obtained in Example 1.

EXAMPLE 4

Process of Invention

In this example 275 grams of flotation tailing salt was mixed with 85 grams of clear sylvinite plant brine. This mixture was then conditioned with 10 cc of 0.25% Polyhall 650 solution. 500 grams of sylvinite brine thickener underflow was mixed with the salt-flocculent-brine mixture followed by filtration.

| Time Interval | | Grams Brine | % Recovery |
| --- | --- | --- | --- |
| 15 | seconds | 192 | 42 |
| 30 | " | 270 | 59 |
| 45 | " | 314 | 68 |
| 60 | " | 326 | 71 |

During the first 30 seconds, the crucial time period in vacuum filtration, the filtration rate obtained for this example was double the rate obtained in Examples 2 and 3 in which the flocculent was added to the underflow.

EXAMPLES 5 AND 6

These examples were run to evaluate a purified guar gum flocculent on potash ore clay filtration. This product, obtained from Stein-Hall Company, is identified as No. 387. In Example 5, 500 grams of sylvinite brine thickener underflow from commercial slime thickeners was mixed with 10 cc of 0.5% guar gum solution (about 4 lbs. per ton of clay) followed by mixing with 85 grams of clear sylvinite plant brine and 275 grams of flotation tailings salt. In Example 6, the same quantities were used, but the guar was first mixed with the flotation tailings salt-clear brine slurry and this mixture then blended with the slime thickener underflow.

| Filtration Time Interval (Seconds) | EXAMPLE NO. 5 | | EXAMPLE NO. 6 | |
| --- | --- | --- | --- | --- |
| | Grams Filtrate | % Brine Recovered | Grams Filtrate | % Brine Recovered |
| 15 | 81 | 18 | 186 | 40 |
| 30 | 138 | 30 | 279 | 61 |
| 45 | 186 | 40 | 315 | 68 |
| 60 | 224 | 49 | 328 | 71 |
| 90 | 282 | 61 | | |
| 120 | 310 | 67 | | |
| 150 | 326 | 71 | | |

These results parallel those obtained with Polyhall 650. Conditioning the salt with flocculent essentially doubles the filtration rate during the crucial first thirty second period.

In Examples 7 to 9, 275 grams of halite tailings, 10 cc of flocculent at 0.25% (Polyhall 650) — a rate equivalent of about two pounds of flocculent per ton of dry clay, and 500 grams of sylvinite brine thickener underflow were used in all of the tests. All test batches were filtered on a Buckner funnel with a graduated cylinder inserted under the discharge of the funnel into the filter flask to measure the amount of filtrate collected in 15 and 30 seconds.

EXAMPLE 7

Control

Procedure: 275 grams of halite tailings were conditioned with 10 cc of flocculent followed by mixing with 500 grams of thickener underflow.

| Filtration Time (Seconds) | cc Filtrate Collected | Grams Collected | Filtration Rate in Grams per Minute |
|---|---|---|---|
| 15 | 110 | 140.8 | 563 |
| 30 | 170 | 217.6 | 435 |

EXAMPLE 8

Process of Invention

Procedure: Same as Example 7, except that the halite tailings were mixed with 85 grams of sylvinite plant brine before conditioning with flocculent.

| Filtration Time (Seconds) | cc Filtrate Collected | Grams Collected | Filtration Rate in Grams per Minute |
|---|---|---|---|
| 15 | 132 | 168.9 | 676 |
| 30 | 215 | 275.2 | 550 |

EXAMPLE 9

Process of Invention

Procedure: Same as Example 7, except that the halite tailings were mixed with 117.5 grams of clear plant brine before conditioning with flocculent.

| Filtration Time (Seconds) | cc Filtrate Collected | Grams Collected | Filtration Rate in Grams per Minute |
|---|---|---|---|
| 15 | 182 | 232.9 | 932 |
| 30 | 255 | 326.4 | 652 |

As the above results show, filtration rate increases significantly as the pulp density of the salt slurry decreases before conditioning the salt with the flocculent. The solids content of the salt-brine slurry in Example 9 is about 60%.

In Example 10 a theoretical operating summary is provided to illustrate the preferred embodiment of the invention in which white muriate of potash is produced and sylvite values in the halite tailings and in the solid fines of the thickened brine underflow are recovered.

EXAMPLE 10

Operating Summary (Parts by Weight)

| | | Solid KCL | Other Salts | Clay | Brine | Total |
|---|---|---|---|---|---|---|
| (1) | Thickener Brine Underflow | 20 | 75 | 34 | 587 | 716 |
| (2) | Heat to 50°C. and discharge to filter feed mixer | | 75 | 34 | 607 | 716 |
| (3) | Halite Tailing - Brine Slurry | 31 | 630 | 34 | 394 | 1,060 |
| (4) | Heat to 50°C. and discharge to filter feed mixer | | 630 | 5 | 425 | 1,060 |
| | Filter feed mixer (Total of (2) and (4)) | | 705 | 39 | 1,032 | 1,776 |
| (5) | Filter Cake to Waste | | 705 | 39 | 186 | 930 |
| (6) | Filtrate to Crystallizers | | | | 846 | 846 |
| (7) | Cool to 30°C. Crystallizer Discharge | 42 | | | 804 | 846 |
| (8) | White Muriate Product | 42 | | | | 42 |
| (9) | Brine to Recycle | | | | 804 | 804 |

It will be evident from an analysis of line 5 that a considerable amount of brine is nevertheless lost with the halite tailings filter cake, since it is impossible to entirely dewater this filter cake. Since the brine contains about 10% by weight potsssium chloride, a loss of 19 units of potassium chloride is indicated. Accordingly, there is some justification for washing the filter cake lightly with water, or more preferably with a saturated sodium chloride brine which is readily prepared by dissolving halite tailings in water. This water wash will remove a considerable portion of the sylvinite brine adhering to the filter cake, essentially replacing this sylvinite brine with halite brine. In this manner the process losses may be still further reduced.

What is claimed is:

1. In the method of clarifying sylvinite brine wherein brine containing clay and sylvinite fines is settled in a thickener vessel to provide a clarified brine overflow and a thickened brine underflow enriched with respect to clay and sylvinite fines, the improvement comprising preparing a first slurry comprising about 25 to about 50% by weight of essentially clear sylvinite brine; 50 to 75% by weight halite tailings; and flocculent in an amount sufficient to assist the subsequent filtration step; agitating the slurry to provide a uniform mixture; and adding to the agitated slurry thickened brine underflow to provide a second slurry containing about 35 to about 75% thickened brine underflow; and filtering the second slurry to recover a clarified sylvinite brine.

2. The method in accordance with claim 1 in which said flocculent is employed in the amount of about 1 to 4 pounds per ton of clay in said underflow.

3. The method in accordance with claim 2 in which said thickened brine underflow contains about 4 to 7% by weight clay.

4. A method in accordance with claim 3 in which said thickened brine underflow contains about 15 to 25% halite fines.

5. A method in accordance with claim 4 in which said halite tailings are predominantly −6 +50 mesh.

6. The method in accordance with claim 2, including the steps of heating said first slurry and said thickened brine underflow to a temperature not in excess of about 60° C. prior to the filtration step, whereby sylvite particles therein are dissolved, cooling the clarified sylvinite brine resulting from the filtration step to about 25° to about 35° C. to crystallize potassium chloride, and separating the crystallized potassium chloride from said clarified sylvinite brine.

7. A method in accordance with claim 6 in which said sylvinite brine and tailings of said first slurry are separately heated prior to the addition of said flocculent and said thickened brine underflow is separately heated prior to admixture with said first slurry.

8. The method in accordance with claim 7 in which, after filtration but before cooling, said clarified sylvinite brine is further heated to a temperature of about 85° to 95° C. and fine potassium chloride is added thereto in an amount sufficient to provide a solution which is saturated with respect to potassium chloride, whereby the production of potassium chloride crystals in the cooling step is increased.

9. A method in accordance with claim 1, including the steps of heating said first slurry and said thickened brine underflow to a temperature not in excess of about 60° C. prior to the filtration step, whereby sylvite particles therein are dissolved, cooling the clarified sylvinite brine resulting from the filtration step to about 25° to about 35° C. to crystallize potassium chloride, and separating the crystallized potassium chloride from said clarified sylvinite brine.

10. A method in accordance with claim 9 in which said sylvinite brine and tailings of said first slurry are separately heated prior to the addition of said flocculent and said thickened brine underflow is separately heated prior to admixture with said first slurry.

11. The method in accordance with claim 10 in which, after filtration but before cooling, said clarified sylvinite brine is further heated to a temperature of about 85° to 95° C. and fine potassium chloride is added thereto in an amount sufficient to provide a solution which is saturated with respect to potassium chloride, whereby the production of potassium chloride crystals in the cooling step is increased.

* * * * *